United States Patent [19]

Simpson

[11] Patent Number: 4,873,184

[45] Date of Patent: Oct. 10, 1989

[54] SUPERSENSITIZATION OF SILVER HALIDE PHOTOTHERMOGRAPHIC EMULSIONS

[75] Inventor: Sharon M. Simpson, Lake Elmo, Minn.

[73] Assignee: Minnesota Mining and Manufacturing Company, St. Paul, Minn.

[21] Appl. No.: 152,755

[22] Filed: Feb. 5, 1988

[51] Int. Cl.$^4$ .......................... G05C 1/08; G05C 1/12
[52] U.S. Cl. .................................... 430/617; 430/570; 430/572; 430/573
[58] Field of Search ................ 430/617, 570, 572, 573

[56] References Cited

U.S. PATENT DOCUMENTS

| | | | |
|---|---|---|---|
| 2,288,226 | 6/1942 | Carroll et al. | 95/7 |
| 3,458,316 | 7/1969 | Viro | 96/94 |
| 3,481,742 | 12/1969 | Terashima et al. | 96/104 |
| 4,002,479 | 1/1977 | Suzuki et al. | 430/570 |
| 4,318,979 | 3/1982 | Habu et al. | 430/434 |
| 4,476,220 | 10/1984 | Penfound | 430/570 |
| 4,619,892 | 10/1986 | Simpson et al. | 430/505 |

FOREIGN PATENT DOCUMENTS

| | | |
|---|---|---|
| 0123983 | 7/1984 | European Pat. Off. |
| 691715 | 5/1953 | United Kingdom . |
| 1221137 | 2/1971 | United Kingdom . |
| 1221138 | 2/1971 | United Kingdom . |

*Primary Examiner*—Paul R. Michl
*Assistant Examiner*—Thorl Chea
*Attorney, Agent, or Firm*—Donald M. Sell; Walter N. Kirn; Mark A. Litman

[57] ABSTRACT

Supersensitization of photothermographic silver halide emulsions is effected by the addition of a metal chelating agent to a photothermographic emulsion which is or becomes spectrally sensitized.

25 Claims, No Drawings

SUPERSENSITIZATION OF SILVER HALIDE PHOTOTHERMOGRAPHIC EMULSIONS

BACKGROUND OF THE INVENTION

The phenomenon of supersenitization is well known to those skilled in the photographic art. Supersensitization is not limited to the effect of multiple sensitizing dyes themselves but also includes compounds which increase the speed of an emulsion after dye sensitization. These additives supersensitize the dye sensitizer even when the additive compound itself does not sensitize the silver halide in the spectral region in which the sensitizer is active. Upon addition of the compound, the spectral sensitivity of the dye is increased. The supersensitizer may be either increasing the absorption of light by the dye (intensifying the J-Band) or increasing the adsorption of the dye to the silver halide grain surface. These theories are described in the art (e.g., James, T. H., *The Theory of the Photographic Process* p. 259–261, Macmillan Publishing (New York 1977), Sturge, J. M., *Neblette's Handbook of Photography and Reprography*, p. 92–96, Litton Education Publishing (New York 1977).

Triphenylphosphine, stilbene-like moieties such as bis(triazine-2-ylamino) stilbene benzothiazole or benzoxazole type compounds, as described in U.S. Pat. No. 4,603,104 and European Patent No. 123,983 have been added to dye sensitized emulsiosn as speed enhancers.

Ethylenediaminetetraacetic acid (EDTA), disthylenetriaminepentaacetic acid (DTPA) and other amine-type acetic acid compounds are not known as supersensitizers but are well known in the photographic art as chelating agents used in developer solutions during processing. This use is described in the art (e.g., U.S. Pat. No. 4,588,677).

Great Britain Patent No. 1,221,137 describes the use of DTPA, EDTA and other amine-type acetic acid compounds to improve emulsion sensitivity. These compounds are added during the formation of silver halide grains (precipitation) and excess compound is removed during the washing process. The patent further states that no speed enhancement is observed if the chelating agents are added after sulfur (chemical) sensitization rather than during the precipitation step.

In connection with this patent, Great Britain Patent No. 1,221,138 describes reducing metal spots on coated emulsion layers by the addition of these chelating agents after chemical sensitization. This invention only describes the prevention of metal spots and does not report an increase in emulsion sensitivity.

The use of mercaptotetrazoles as supersensitizers in combination with certain cyanine dyes, hydroquinones, bis(triazine-2-ylamino) stilbenes, and poly(ethylacrylate) has been described in U.S. Pat. Nos. 2,403,977; 3,266,897; 3,397,987; 3,457,078; 3,637,393 and 4,603,104.

U.K. Patent No. 691,715 discloses the improvement of light-sensitivity of colloid-silver halide emulsions by the addition of ethylenediamine tetraacetic acid (or its salts and esters) prior to the end of the emulsion digestion period for silver halide emulsions. Only small amounts are used, with a range of 0.097% to 0.91% by weight of amine to silver disclosed.

U.S. Pat. No. 3,458,316 discloses the improvement of light-sensitivity of silver halide gelatin emulsions by the addition of nitrilotriacetic acid and its water-soluble salts to emulsions prior to the precipitation of silver halide grains therein.

Silver halide photothermographic emulsions and recording media are well known commercial materials. These media comprise a silver source material (light insensitive), a radiation sensitive silver catalyst forming material (e.g., silver halide), and a mild reducing agent for silver ion. The radiation sensitive material is in catalytic proximity to the radiation insensitive silver source material. Such media are described in U.S. Pat. Nos. 3,457,075; 3,839,049; 4,260,677; and 4,460,681. These materials are also usefully spectrally sensitized and it is always desirable to have the capability of increasing the sensitized speed of these articles.

SUMMARY OF THE INVENTION

The addition of at least 0.2% by weight of total silver of a metal complexing agent to a silver halide photothermographic emulsion in combination with a spectral sensitizing dye, increases the speed of the emulsion generally beyond the additive speed of the individual ingredients. Preferred complexing agents include nitrilotriacetic acid, ethylenediaminetetraacetic acid (and its alkali metal salts), and diethylenetriaminepentaacetic acid (and its alkali metal salts), triethylenetetraamine hexaacetic acid (and its alkali metal salts). The alkyl (e.g., 1 to 20 carbons, preferably 1 to 4 carbons) and aryl (e.g., 6 to 14 carbons, preferably phenyl) esters of these acids perform equally well in comparison to the acids and in some cases may be more stable. The complexing agents are preferably added after spectral sensitization of the emulsion. These emulsions have not been exposed to radiation and do not have a latent image therein.

DETAILED DESCRIPTION OF THE INVENTION

The combination of a spectral sensitizing dye and a metal complexing agent present in a silver halide photothermographic emulsion provides the emulsion with improved speed. The supersensitization effect is at least additive and usually more than additive then the individual contributions of the components. This supersensitization effect has been found to be operative for spectral sensitizing dyes within both the visible and infrared regions of the electromagnetic spectrum.

The addition of chelating amine-type acetic acids has been found to provide unique supesensitization effects on photothermographic silver halide emulsions.

The amine-type acetic acids useful in the practice of the present invention are defined by the following formulae:

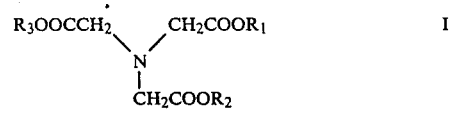

I

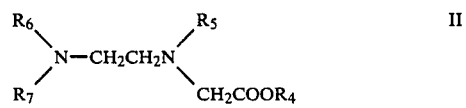

II

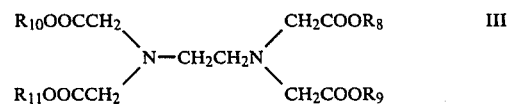

III

-continued

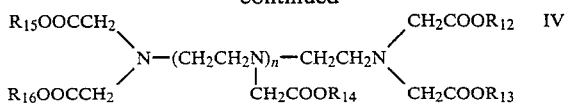

wherein $R_1$ through $R_4$, $R_8$ through $R_{16}$, which can be the same or different, each represents a hydrogen atom, an alkali metal atom, aryl (including aralkyl), or an alkyl group (including alkaryl), and $R_5$-$R_7$, which can be the same or different, each represents a hydrogen atom, an alkyl group or an acetic acid group as shown below

wherein $R_1$ is defined above, and n represents an integer of 1 or greater (preferably 1 to 4).

Specific examples of the amine-type acetic acids represented by the formulae I, II, III and IV are shown below which, however, do not limit the compounds to be used in the present invention.

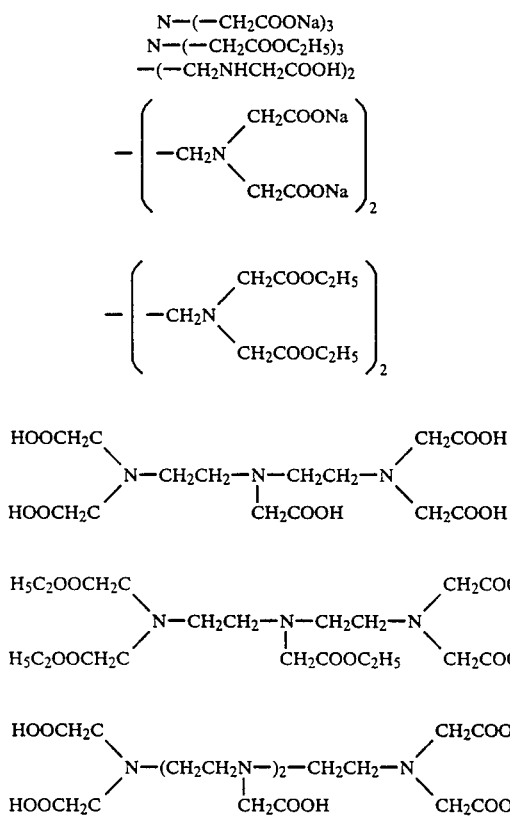

Many of these compounds shown are commercially available. Also, such compounds can be prepared by the methods described, for examples, by Mueller, W. H. *Archivder Pharmazie* 307(5), p. 336–340, 1974. The complexing agents tend to have a pK (Ag) of between 4 and 10, preferably between 5 and 9 in a mildly acidic (pH 4 to 6) aqueous environment.

The sensitizing dyes may be any visible and any infrared spectral sensitizing dye with the preferred structures according to the present invention defined by the following formulae VI, VII and VIII

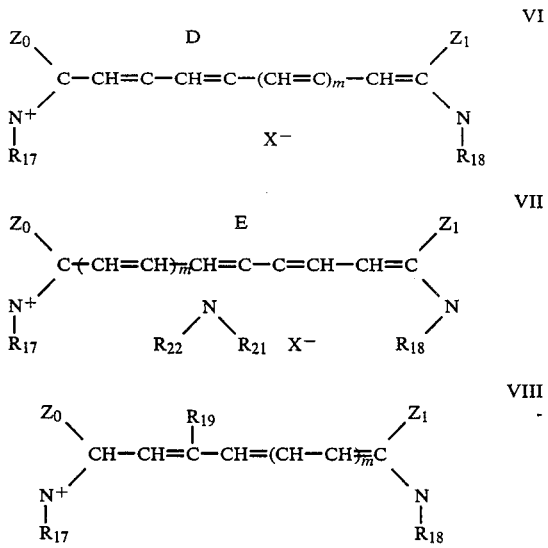

wherein $R_{17}$ and $R_{18}$, which may be the same or different, each represents an alkyl group (preferably containing 1 to 8 carbon atoms, e.g., a methyl group, an ethyl group, a propyl group, a butyl group, a pentyl group, a heptyl group) or a substituted alkyl group preferably containing 6 or less carbon atoms (substituted by, for example, a carboxy group, a sulfo group, a cyano group, a halogen atom (e.g., a fluorine atom, a chlorine atom, a bromine atom), a hydroxy group, an alkoxycarbonyl group (containing 8 or less carbon atoms, e.g., a methoxycarbonyl group, an ethoxycarbonyl group, a benzyloxycarbonyl group), an alkoxy group (containing 7 or less carbon atoms, e.g., a methoxy group, an ethoxy group, a propoxy group, a butoxy group, a benzyloxy group), an aryloxy group (e.g., a phenoxy group, a p-tolyloxy group), an acyloxy group (containing 3 or less carbon atoms, e.g., an acetyloxy group, a propionyloxy group), an acyl group (containing 8 or less carbon atoms, e.g., an acetyl group, a propionyl group, a benzoyl group, a mesyl group), a carbamoyl group (e.g., a carbamoyl group, an N,N-dimethylcarbamoyl group, a morpholinocarbamoyl group, a piperidinocarbamoyl group), a sulfamoyl group (e.g., a sulfamoyl group, an N,N-dimethylsulfamoyl group, a morpholinosulfonyl group), an aryl group (e.g., a phenyl group, a p-hydroxyphenyl group, a p-carboxyphenyl group, a p-sulfophenyl group, an α-naphthyl group), or the like, provided that the alkyl group may be substituted by two or more of these substituents).

$R_{19}$ represents a hydrogen atom, a lower alkyl group containing 5 or less carbon atoms (e.g., a methyl group, an ethyl group, a propyl group), a phenyl group or a benzyl group, a halogen atom, a hydroxyl group, a carboxyl group or an acyloxy group shown below by

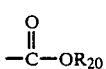

wherein $R_{20}$ represents an alkyl group having 1 to 5 carbon atoms, or an unsubstituted or substituted phenyl group.

D represents non-metallic atoms necessary for completing a 6-membered ring containing three methylene units, which ring may be substituted by a lower alkyl group containing 4 or less carbon atoms (e.g., a methyl group) or the like.

The following formula is a preferred example of the 6-membered ring formed with D and the three methylene units:

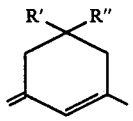

In the above formula, R' and R" each represents a hydrogen atom, a lower alkyl group containing 8 or less carbon atoms such as for example, methyl, ethyl, propyl, butyl, amyl, benzyl, carboxyethyl, sulfopropyl, carboxypropyl, sulfobutyl groups, etc.

E represents the non-metallic atoms (preferably selected from C, N, S, O and Se) necessary for completing a 5-membered ring wherein $R_{21}$ and $R_{22}$, which can be the same or different, each represents a hydrogen atom, an alkyl group or a phenyl group.

$Z_0$ and $Z_1$ each represents non-metallic atoms necessary for completing a 5- or 6-membered, nitrogen-containing heterocyclic ring such as a thiazole nucleus (for example, benzothiazole, naphthothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphthol[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole, a selenazole nucleus (for example, benzoselenazole, 5-chlorobenzoselenazole, 5-methoxybenzoselenazole, 5-methylbenzoselenazole, 5-hydroxybenzoselenazole, naphtho[2,1-d]selenazole, naphtho[1,2-d]selenazole), an oxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluorobenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole, 5-ethoxybenzoxazole, naphtho[2,1-d]oxazole, naphtho[1,2-d]oxazole, naphtho[2,3-d]oxazole), a quinoline nucleus (for example, 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, 8-fluoro-4-quinoline), a 3,3-dialkylindolenine nucleus (for example, 3,3-dimethylindolenine, 3,3-diethylindolenine, 3,3-dimethyl-5-cyanoindolenine, 3,3-dimethyl-5-methoxyindolenine, 3,3-dimethyl-5-methylindolenine, 3,3-dimethyl-5-chloroindolenine), an imidazole nucleus (for example, 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-alkyl-6-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chylorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, 1-ethylnaphtho[1,2-d]imidazole), a pyridine nucleus (for example, pyridine, 5-methyl-2-pyridine, 3-methyl-4-pyridine) and a merocyanine nucleus.

X represents an acid anion, for example, a halide ion (e.g., $Cl^-$, $Br^-$ or $I^-$), perchlorate ion, sulfamate, thiocyanate ion, acetate ion, methylsulfate ion, ethylsulfate ion, benzenesulfonate ion, toluenesulfonate ion.

m represents 0, 1, 2 and 3. Sensitizing dyes represented by the general formula VI, VII and VIII are well known compounds and can be synthesized by the method described in U.S. Pat. No. 2,734,900 and are described for example in U.S. Pat. Nos. 3,457,078; 3,619,154; 3,682,630; 3,690,891; 3,695,888; 4,030,932 and 4,367,800.

Specific examples of the sensitizing dyes represented by the general formula VI, VII and VIII are illustrated below which, however, does not limit the dyes used in the present invention.

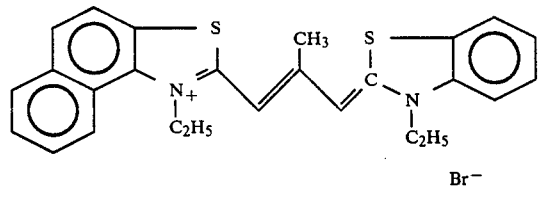

VIII-A

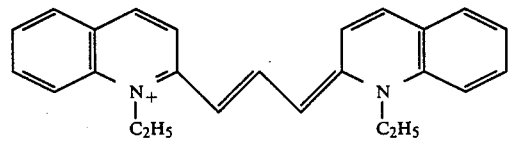

VIII-B

VIII-C
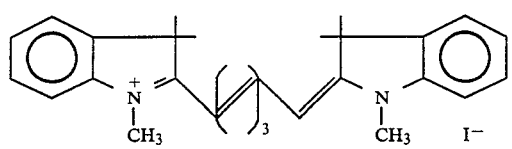
VIII-D
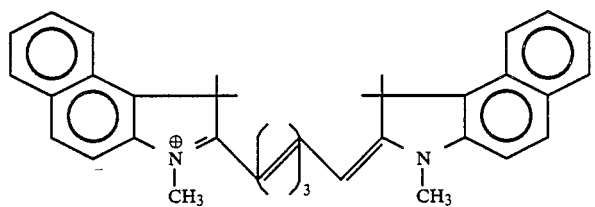
VIII-E
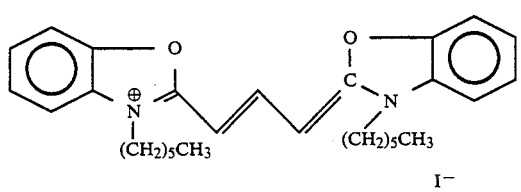
VIII-F
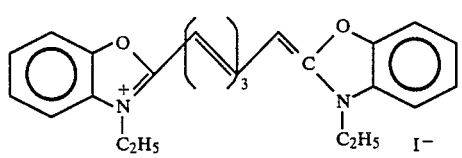
VIII-G
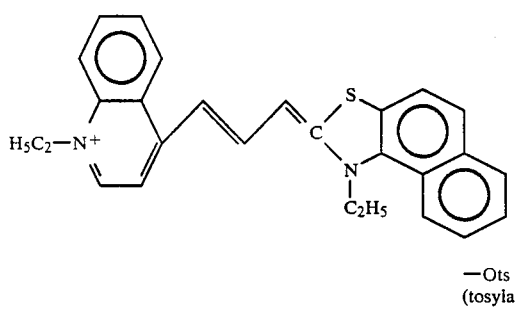
VIII-H
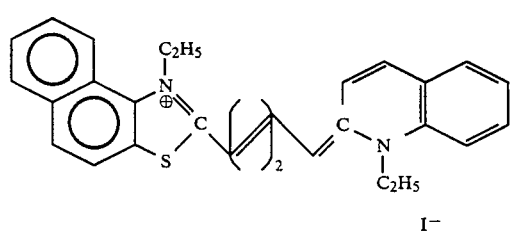
VIII-I
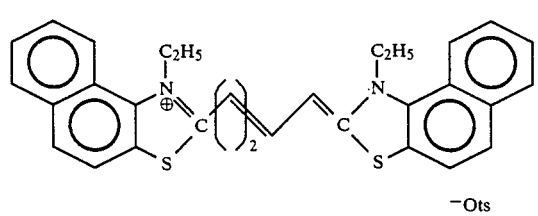

-continued
VI-A
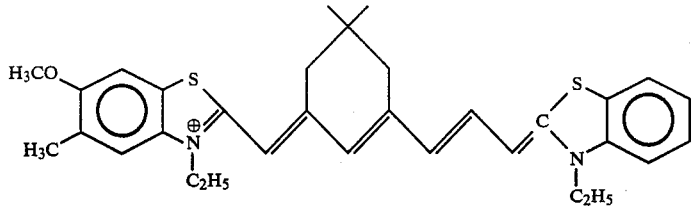
I⁻
VI-B
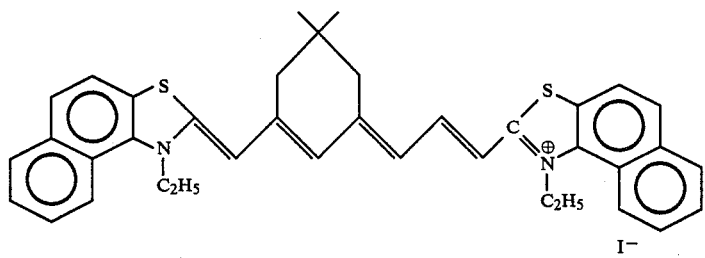
I⁻
VI-C
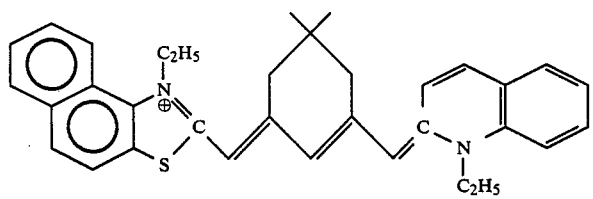
I⁻
VI-D
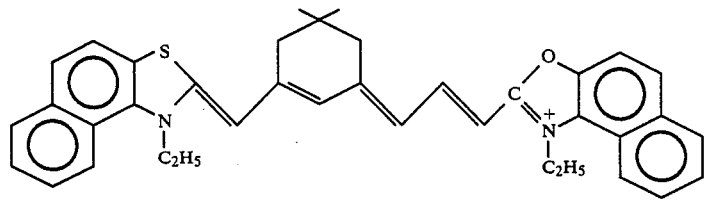
I⁻
VII-A
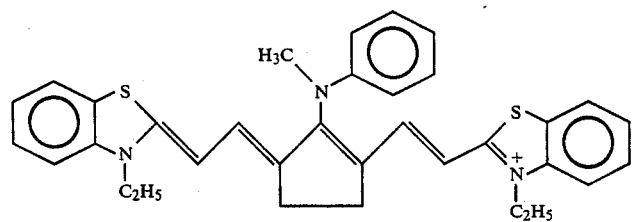
ClO₄⁻
VII-B
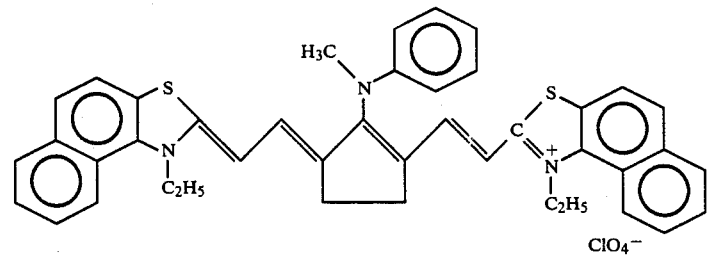
ClO₄⁻
The amine-type acetic acid compound of formulae I, II, III or IV in the present invention are added to the The compounds of formulae I, II, III or IV are added by weight preferably in the range of 1/.1 to 1/200 (dye/compound) and most preferably in the range of 1/.20 to 1/100. The complexing agents are present in an amount equal to or greater than 0.2% by weight total silver in the emulsion layer. Preferably the complexing agents are present as at least 0.4% by weight, preferably in a range of 0.5–40% by weight of silver in the emulsion layer, more preferably 0.6–35%, and most preferably as 0.8–30% by weight of silver in the emulsion layer.

The sensitizing dyes of the formulae VI, VII and VIII in the present invention are added to the silver halide emulsion in amounts of $1 \times 10^{-5}$ mole to $5 \times 10^{-2}$ mole, and most preferably in the amounts of $1 \times 10^{-4}$ to $1 \times 10^{-2}$ mole per mole of silver.

These sensitizing dyes are usually dissolved in a suitable solvent such as methanol, ethanol, methyl, cellusolve, acetone, water, pyridine, or a mixture thereof before adding them to the emulsion. Once added, the mixture is stirred well and the compounds of formula I, II, III IV or V are added just prior to coating.

The concentration of dyes and amine-type acetic acid compounds will vary and supersensitizing effects will vary depending on the silver halide photothermographic emulsion type.

Any of the various types of photographic silver halide emulsions may be used in the practice of the present invention. Silver chloride, silver bromide, silver iodobromide, silver chlorobromide, silver chlorobromide and mixtures thereof may be used for example. Any configuration of grains, cubic orthorhombic, hexagonal, epitaxial, lamellar, tabular or mixtures thereof may be used. These emulsions are prepared by any of the well-known procedures, e.g., single or double jet emulsions as described by Wietz et al., U.S. Pat. No. 2,222,264, Illingsworth, U.S. Pat. No. 3,320,069, McBride, U.S. Pat. No. 3,271,157 and U.S. Pat. Nos. 4,425,425 and 4,425,426.

Photothermographic dry silver emulsions are usually constructed as one or two layers on a substrate. Single layer constructions must contain the silver source material, the silver halide, the developer and binder as well as optional additional materials such as toners, coating aids and other adjuvants. Two-layer constructions must contain the silver source and silver halide in one emulsion layer (usually the layer adjacent the substrate) and some of the other ingredients in the second layer or both layers.

The silver source material, as mentioned above, may be any material which contains a reducible source of silver ions. Silver salts of organic acids, particularly long chain (10 to 30, preferably 15 to 28 carbon atoms) fatty carboxylic acids are preferred. Complexes of organic or inorganic silver salts wherein the ligand has a gross stability constant between 4.0 and 10.0 are also desirable. The silver source material should constitute from about 20 to 70 percent by weight of the imaging layer. Preferably it is present as 30 to 55 percent by weight. The second layer in a two-layer construction would not affect the percentage of the silver source material desired in the single imaging layer.

The silver halide may be any photosensitive silver halide such as silver bromide, silver iodide, silver chloride, silver bromoiodide, silver chlorobromoiodide, silver chlorobromide, etc., and may be added to the emulsion layer in any fashion which places it is catalytic proximity to the silver source. The silver halide is generally present as 0.75 to 15 percent by weight of the imaging layer, although larger amounts up to 20 or 25 percent are useful. It is preferred to use from 1 to 10 percent by weight silver halide in the imaging layer and most preferred to use from 1.5 to 7.0 percent.

The reducing agent for silver ion may be any material, preferably organic material, which will reduce silver ion to metallic silver. Conventional photographic developers such as phenidone, hydroquinones, and catechol are useful, but hindered phenol reducing agents are preferred. The reducing agent should be present as 1 to 10 percent by weight of the imaging layer. In a two-layer construction, if the reducing agent is in the second layer, slightly high proportions, of from about 2 to 15 percent tend to be more desirable.

Toner materials may also be present, for example, in amounts of from 0.1 to 10 percent by weight of all silver-bearing components. Toners are well known materials in the photothermographic art as shown by U.S. Pat. Nos. 3,080,254; 3,847,612 and 4,123,282. Spectral sensitizing dyes may also be used with the emulsions.

The binder may be selected from any of the well-known natural and synthetic resins such as gelatin, polyvinyl acetals, polyvinyl chloride, polyvinyl acetate, cellulose acetate, polyolefins, polyesters, polystyrene, polyacylonitrile, polycarbonates, and the like. Copolymers and terpolymers are of course included in these definitions. The polyvinyl acetals, such as polyvinyl butyral and polyvinyl formal, and vinyl copolymers such as polyvinyl acetate/chloride are particularly desirable. The binders are generally used in a range of from 20 to 75 percent by weight of each layer, and preferably about 30 to 55 percent by weight.

It is also found convenient to use silver halfsoaps, of which an equimolar blend of silver behenate and behenic acid, prepared by precipitation from aqueous solution of the soldium salt of commercial behenic acid and anlyzing about 14.5 percent silver, represents a preferred example. Transparent sheet materials made on transparent film backing require a transparent coating and for this purpose the silver behenate full soap, containing not more than about four or 5 percent of free behenic acid and analyzing about 25.2 percent silver may be used. Other components, such as coloring, opacifiers, extenders, specral sensitizing dyes, etc. may be incorporated as required fro various specific purposes. Antifoggants, such as mercuric salts and tetra-chlorophthalic anhydride, may also be included in the formulation.

The substrate with backside resistive heating layer may also be used in color photothermographic imaging systems such as shown in U.S. Pat. Nos. 4,460,681 and 4,374,921.

The use of preformed silver halide emulsions supersensitized with the dyes of this invention can be unwashed or washed to remove soluble salts. In the latter case the soluble salts can be removed by chill-setting and leaching or the emulsion can be coagulation washed e.g., by the procedures described in Hewitson et al., U.S. Pat. No. 2,618,556; Yutzy et al., U.S. Pat. Bo. 2,614,928; Yackel, U.S. Pat. No. 2,565,418; Hart et al., U.S. Pat. No. 3,241,969; and Waller et al., U.S. Pat. No. 2,489,341. The silver halide grains may have any crystalline habit including, but not limited to cubic, tetrahedral, orthorhombic, tabular, laminar, platelet, etc.

Photothermographic emulsions containing supersensitizing combinations in accordance with this invention which are used in preformed silver halide photothermographic systems can be sensitized with chemical sensitizers, such as with reducing agents; sulfur, selenium or tellurium compounds; gold, platinum or palladium compounds; or combinations of these. Suitable chemical sensitization procedures are described in Shepard, U.S. Pat. No. 1,623,499; Waller, U.S. Pat. No. 2,399,083; McVeigh, U.S. Pat. No. 3,297,447; and Dunn, U.S. Pat. No. 3,297,446.

Silver halide emulsions containing the supersensitizing combinations of this invention can be protected against the production of fog and can be stabilized against loss of sensitivity during keeping. Suitable antifoggants and stabilizers which can be used alone or in combination, include the thiazolium salts described in Staud, U.S. Pat. No. 2,131,038 and Allen U.S. Pat. No. 2,694,716; the azaindenes described in Piper, U.S. Pat. No. 2,886,437 and Heimbach, U.S. Pat. No. 2,444,605; the mercury salts described in Allen, U.S. Pat. No. 2,728,663; the urazoles described in Anderson, U.S. Pat. No. 3,287,135; the sulfocatechols described in Kennard, U.S. Pat. No. 3,235,652; the oximes described in Carrol et al., British Patent No. 623,448; nitron; nitroindazoles; the polyvalent metal salts described in Jones, U.S. Pat. No. 2,839,405; the thiuronium salts described in Herz, U.S. Pat. No. 3,220,839; and the palladium, platinum and gold salts described in Trivelli, U.S. Pat. No. 2,566,263 and Damschroder, U.S. Pat. No. 2,597,915.

Emulsions supersensitized in accordance with this invention can be used in photothermographic elements which contain antistatic or conducting layers, such as layers that comprise soluble salts, e.g., chlorides, nitrates, etc., evaporated metal layers, ionic polymers such as those described in Minsk, U.S. Pat. Nos. 2,861,056 and 3,206,312 or insoluble inorganic salts such as those described in Trevoy, U.S. Pat. No. 3,428,451.

Photothermographic emulsions containing the supersensitizing combinations of the invention can be coated on a wide variety of supports. Typical supports include polyester film, subbed polyester film, poly(ethylene terephthalate) film, cellulose nitrate film, cellulose ester film, poly(vinyl acetal) film, polycarbonate film and related or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers and the like.

Supersensitized emulsions of the invention can contain plasticizers and lubricants such as polyalcohols, e.g., glycerin and diols of the type described in Milton, U.S. Pat. No. 2,960,404; fatty acids or esters such as those described in Robins, U.S. Pat. No. 2,588,765 and Duane, U.S. Pat. No. 3,121,060; and silicone resins such as those described in DuPont British Patent No. 955,061.

Photothermographic elements containing emulsion layers sensitized as described herein can contain matting agents such as starch, titanium dioxide, zinc oxide, silica, polymeric beads including beads of the type described in Jelley et al., U.S. Pat. No. 2,992,101 and Lynn, U.S. Pat. No. 2,701,245.

Photothermographic elements containing emulsion layers supersensitized according to he present invention can be used in photographic elements which contain light absorbing materials and filter dyes such as those described in Sawdey, U.S. Pat. No. 3,253,921; Gaspar, U.S. Pat. No. 2,274,782; Carroll et al., U.S. Pat. No. 2,527,583 and Van Campen, U.S. Pat. No. 2,956,879. If desired, the dyes can be mordanted, for example, as described in Milton and Jones, U.S. Pat. No. 3,282,699.

Contrast enhancing additives such as hydrazines, rhodium, ruthenium, palladium, iridium and combinations thereof are also useful.

Photothermographic emulsions of this invention can be coated by various coating procedures including dip coating, air knife coating, curtain coating, or extrusion coating using hoppers of the type described in Benguin, U.S. Pat. No. 2,681,294. If desired, two or more layers may be coated simultaneously by the procedures described in Russell, U.S. Pat. No. 2,761,791 and Wynn British Patent No. 837,095.

The photothermographic elements can include image dye stabilizers. Such image dye stabilizers are illustrated by U.K. Patent No. 1,326,889; Lestina et al. U.S. Pat. Nos. 3,432,300 and 3,698,909; Stern et al. U.S. Pat. No. 3,574,627; Brannock et al. U.S. Pat. No. 3,573,050; Arai et al. U.S. Pat. No. 3,764,337 and Smith et al. U.S. Pat. No. 4,042,394.

The color provided in the image produced by exposure of the differently sensitized silver halide emulsion layers does not have to be produced by color coupler reaction with oxidized color developers. A number of other color image forming mechanisms well known in the art can also be used. Amongst the cmmercially available color image forming mechanisms are the diffusion transfer of dyes, dye-bleaching, and leuco dye oxidation. Each of these procedures is used in commercial products, is well understood by the ordinarily skilled photographic artisan, and is used with silver halide emulsions. Multicolor elements using these different technologies are also commercially available. Converting the existing commercially available systems to the practice of the present invention could be done by routine redesign of the sensitometric parameters of the system according to the teachings of the present invention. For example, in a conventional instant color, dye transfer diffusion element, the sensitivity of the various layers and/or the arrangement of filters between the silver halide emulsion layers would be directed by the teachings of the present invention, the element otherwise remaining the same.

These types of imaging systems are well known in the art. Detailed discussions of various dye transfer, diffusion processes may be found for example in "A Fundamentally New Imaging Technology for Instant Photography", Vol. 20, No. 4, July/August 1976, and Neblette's Handbook of Photography and Reprography, Materials, Processes and Systems, 7th Edition, John M. Stunge, van Nostrand Reinhold Company, N.Y., 1977, pp. 324-330 and 126. Detailed discussion of dye-bleach color imaging systems are found for example in *The Reproduction of Colour*, 3rd Ed., R. W. G. Hunt, Fountain Press, London, England 1975 pp. 325-330; and *The Theory of the Photographic Process*, 4th Ed., Mees and James, Macmillan Publishing Co., Inc., N.Y., 1977 pp. 363-366. Pages 366-372 of Mees and James, supra. also discuss dye-transfer processes in great detail. Leuco dye oxidation in silver halide systems are disclosed in such literature as U.S. Pat. Nos. 4,460,681, 4,374,821 and 4,021,240.

Other conventional photographic addenda such as coating aids, antistatic agents, acutance dyes, antihalation dyes and layers, antifoggants, latent image stabilizers, antikinking agents, and the like may also be present.

Example 1

A 15 percent solution of copolymer of polyvinylchloride-vinylacetate (Tg 79° C., Bakelite VYNS ™, Union Carbide Corp., New York, NY) in methyl ethyl ketone and toluene was coated at a wet thickness of 4 mils onto a vesicular opaque polyester film and dried at 82° C. (180° F.) in an oven for 5 min. as an image-receiving layer.

A dispersion of silver behenate half soap was made at 10% solids in toluene and ethanol by homogenization. To 110g of this silver half soap dispersion was added 380g of ethanol. Then 4ml of mercuric bromide (0.72g/20ml of methanol) was added and 2 ml of zinc bromide (0.45g/20ml of methanol) was added 4 hours later. Then 26 grams of polyvinylbutyral was added one hour later.

To 10.0g of this final silver half soap dispersion was added 1.5ml of the sensitizing dye A (0.01g/100 ml of methanol). After 20 minutes, a magenta color-forming leuco dye solution was added as shown below.

| Component | Amount |
| --- | --- |
| tetrahydrofuran | 2.5 ml |
| methanol | 1.5 ml |
| leuco dye B | 0.06 g |
| phthalazinone | 0.10 g |

The leuco dye is disclosed in U.S. Pat. Appl. 946,970 and has the following formula:

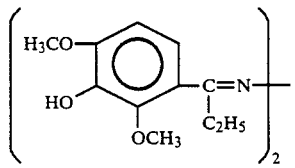
B.

After sensitization with the dye and the addition of the leuco-base dye, compound C was added in the amounts of 0.2ml, 0.5ml or 1.0ml (0.01g/10ml of methanol. The resulting dispersion was coated at a wet thickness of mils over the resin layer and dried at 82° C. (180° F.) in an oven for 5 minutes.

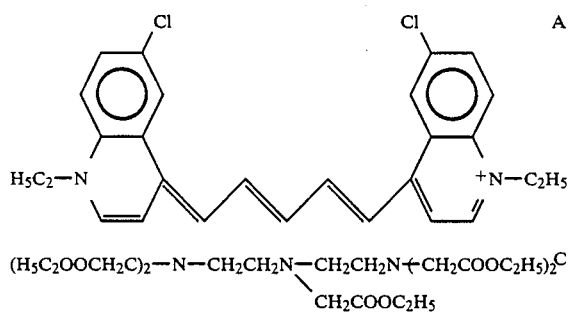
A

The resulting sheets were then exposed to an EK101 sensitometer through an 880nm narrow band pass filter for 30.8 seconds to produce a developable latent image in the heat developable photosensitive layer. The exposed material was heat-developed for 30 seconds at 138° C. (280° F.) on a heat blanket. A magenta dye image and a silver image were formed on the light exposed area of the sheets. The reflection density to green light was measured and the following sensitometric data was obtained from the samples:

|  | Dmin | Dmax | Speed[1] | ERGS/cm$^2$ |
| --- | --- | --- | --- | --- |
| Control (0 ml C) | .23 | 1.77 | 3.23 | 1679 |
| 0.2 ml C | .24 | 1.75 | 2.98 | 964 |
| 0.5 ml C | .23 | 1.69 | 2.81 | 638 |
| 1.0 ml C | .17 | 1.53 | 2.11 | 129 |

[1]Speed measured at 1.0 density above Dmin

EXAMPLE 2

The image-receiving layer and the silver coating layer were prepared in a similar manner as described in Example 1 except 0.1ml (0.1g/10ml MeOH) of compound C was added after the leuco dye mixture. After exposure and processing, the silver coating layer was stripped off from the image receiving layer. A clear magenta dye image was observed to have been transferred to the image-receiving layer corresponding to the silver image in the photosensitive layer. The reflection density was measured and the sensitometric data are shown below.

|  | Dmin | Dmax | Speed[1] | ERGS/cm$^2$ |
| --- | --- | --- | --- | --- |
| Control (0 ml C) | .16 | 2.33 | 3.22 | 1660 |
| 0.1 ml C | .17 | 2.41 | 2.77 | 589 |

[1]Speed measured at 1.0 density above Dmin

EXAMPLE 3

The image-receiving layer and the silver coating layer were prepared in a simlar manner as described in Example 1 except 0.5ml or 1.0ml (0.02g/10ml of methanol) of compound D was added after the addition of the leuco dye mixture $$[H_2C-N+CH_2COOC_2H_5)_2]_2 \qquad D$$

The examples were processed and analyzed in the same manner as Example 1. The sensitometric results are shown below.

|  | Dmin | Dmax | Speed[1] | ERGS/cm$^2$ |
| --- | --- | --- | --- | --- |
| Control (0 ml D) | .23 | 1.77 | 3.32 | 1679 |
| 0.5 ml D | .27 | 1.80 | 2.97 | 931 |
| 1.0 ml D | .24 | 1.79 | 3.11 | 1297 |

[1]Speed measured at 1.0 density above Dmin

EXAMPLE 4

The image-receiving layer and the silver coating layer were prepared in a similar manner as described in Example 1 except 0.5ml or 1.0ml (0.02g/10ml of methanol) of compound E was added after the addition of the leuco dye mixture $$N+CH_2COOC_2H_5)_3 \qquad E$$

The samples were processed and analyzed in the same manner as Example 1. The sensitometric results are shown below.

|  | Dmin | Dmax | Speed[1] | ERGS/cm$^2$ |
| --- | --- | --- | --- | --- |
| Control (0 ml E) | .23 | 1.77 | 3.23 | 1679 |

| | Dmin | Dmax | Speed[1] | ERGS/cm$^2$ |
|---|---|---|---|---|
| 0.5 ml E | .27 | 1.78 | 3.05 | 1114 |
| 1.0 ml E | .24 | 1.72 | 3.08 | 1191 |

[1]Speed measured at 1.0 density above Dmin

It is to be noted that in the practice of the present invention the addition of phenylmercaptotetrazoles has been found to be particularly undesirable as it reduces the speed of the emulsion.

EXAMPLE 5

A dispersion of silver behenate half soap was made at 10% solids in toluene and ethanol by homogenization. To 100g of this half-soap dispersion was added 380g of ethanol. Then 6 mls of mercuric bromide (0.72g/20 ml methanol) was added and 26g of polyvinylbutyral was added 4 hours later.

To 10.0g of this final silver half soap dispersion was added 0.5 ml of the sensitizing dye F (0.016g/25 ml methanol). After 20 minutes, compound C was added in the amounts of 0.2 ml or 0.5 ml (0.02g/10 ml methanol). After sensitization with the dye and the addition of the speed enhancing compound, the leuco dye solution described in Example 1 was added to the silver soap dispersion. The resulting final dispersion was coated at a wet thickness of 4 mils onto a vesicular opaque polyester film and dried at 82° C. (180° F.) in an oven for 5 minutes.

The resulting sheets were then exposed to an EG and G Sensitometer (EG and G, Inc., Salem, MA) through a Wraen 25 red color narrow bandpass filter for 10$^{-3}$ seconds to produce a developable latent image and were heat-developed at 138° C. (280° F.) on a heat blanket for 10 seconds. A magenta dye image and a silver image were formed on the light exposed area of the sheets. The reflection density to green light was measured and the following sensitometric data was obtained from the samples:

| | Dmin | Dmax | Speed[2] | ERGS/cm$^2$ |
|---|---|---|---|---|
| Control (0 ml C) | .15 | 1.67 | 2.18 | 151 |
| 0.2 ml C | .15 | 1.88 | 2.07 | 117 |
| 0.5 ml C | .15 | 1.81 | 2.00 | 100 |

[2]Speed measured at 0.6 density above Dmin

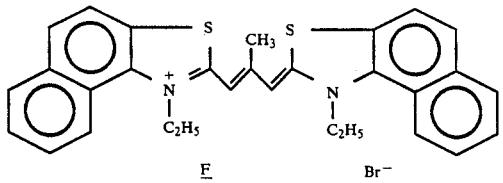

F  Br$^-$

EXAMPLE 6

The silver soap dispersion was prepared in a similar manner as described in Example 1. To 10.0g of this final silver half soap dispersion was added 2.0ml of the sensitizing dye G (0.016g/25 ml methanol). After 20 minutes, compound C was added in the amount of 0.5ml (0.02g/10ml methanol). After sensitization with the dye and the addition of the speed enhancing compound, the leuco dye solution described in Example 1 was added to the silver soap solution dispersion. The resulting final dispersion was coated at a wet thickness of 4 mils onto a vesicular opaque polyester film and dried at 82° C. (180° F.) in an oven for 5 minutes.

The resulting sheets were then exposed to an EG and G sensitometer through a Wraen 58 green color narrow bandpass filter for 10$^{-3}$ seconds to produce a developable latent image and were heat-developed at 138° C. (280° F.) on a heat blanket for 20 seconds. A magenta dye image and a silver image were formed on the light exposed area of the sheets. The reflection density to green light was measured and the following sensitometric data was obtained from the samples:

| | Dmin | Dmax | Speed[1] | ERGS/cm$^2$ |
|---|---|---|---|---|
| Control | .22 | 1.77 | 2.10 | 126 |
| 0.5 ml C | .23 | 1.84 | 1.86 | 72 |

[1]Speed measured at 1.0 density above Dmin.

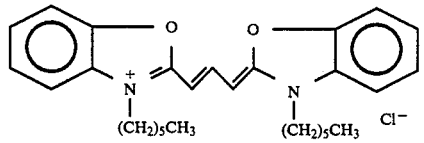

G

What is claimed is:

1. A spectrally sensitized silver halide photothermographic emulsion layer comprising a reducible silver source material as 20 to 70% by weight of said emulsion layer, photosensitive silver halide, and a reducing agent for silver ion, said silver halide having no latent image therein and being present as 1.5 to 7.0% by weight of said emulsion layer and said emulsion layer having a speed increasing effective amount of a metal complexing agent therein in an amount equal to 0.4 to 40% by weight of total silver in said emulsion.

2. The emulsion of claim 1 wherein said complexing agent is an amine-type acetic acid compound, ester compounds thereof, or alkali metal salt thereof.

3. The emulsion of claim 2 wherein said amine-type acetic acid compounds are present in a range bewteen 0.4 and 40% by weight of total silver in said emulsion and are represented by any of the formulae:

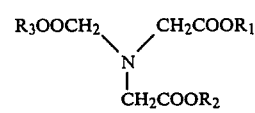

I

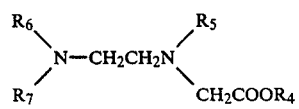

II

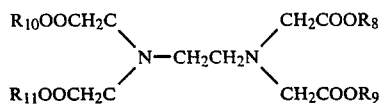

III

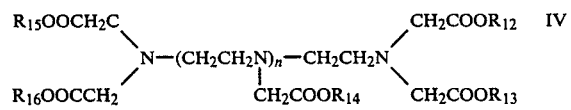

IV wherein $R_1$ through $R_4$, $R_8$ through $R_{16}$, which can be the same or different, each represents a hydrogen atom, an alkali metal atom, aryl group, or an alkyl group, and $R_5$-$R_7$, which can be the same or different, each represents a hydrogen atom, an alkyl group or an acetic acid group as shown below

—CH$_2$COOR$_1$ wherein R$_1$ is defined above, and n represents an integer of 1 or greater.

4. The emulsion of claim 1 wherein said metal complexing agent was added after spectral sensitization.

5. The emulsion of claim 2 wherein said metal complexing agent was added after spectral sensitization.

6. The emulsion of claim 3 wherein said metal complexing agent was added after spectral sensitization.

7. The emulsion of claim 1 containing a sensitizing dye represented by the formulae:

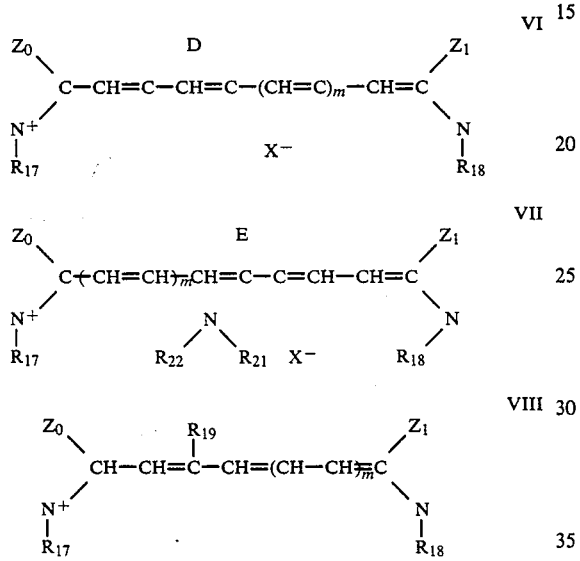

wherein R$_{17}$ and R$_{18}$, which may be the same or different, each represents 1) an alkyl group (containing 1 to 8 carbon atoms, or 2) a substituted alkyl group containing 6 or less carbon atoms substituted by a substituent selected from the group consisting of a carboxy group, a sulfo group, a cyano group, a halogen atom, a hydroxy group, an alkoxycarbonyl group (containing 8 or less carbon atoms), an alkoxy group (containing 7 or less carbon atoms), an aryloxy group, an acyloxy group containing 3 or less carbon atoms, an acyl group containing 8 or less carbon atoms, a carbamoyl group, a sulfamoyl group, and an aryl group, or the like, provided that the alkyl group may be substituted by two or more of these substituents, R$_{19}$ represents a hydrogen atom, a lower alkyl group containing 5 or less carbon atoms, a phenyl group or a benzyl group, a halogen atom, a hydroxyl group, a carboxyl group or an acyloxy group shown below by the formula

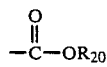

wherein R$_{20}$ represents an alkyl group having 1 to 5 carbon atoms, or an unsubstituted or substituted phenyl group, D represents the non-metallic atoms necessary for completing a 6-membered ring containing three methylene units, which ring may be substituted by an alkyl group containing 8 or less carbon atoms, including a ring of the formula:

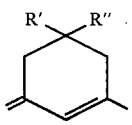

wherein R' and R" each represents a hydrogen atom, or an alkyl group (substituted or not) containing 8 or less carbon atoms, E represents the non-metallic atoms selected from C, N, S, O and Se necessary for completing a 5-membered ring wherein R$_{21}$ and R$_{22}$, which can be the same or different, each represents a hydrogen atom, an alkyl group or a phenyl group, Z$_0$ and Z$_1$ each represents non-metallic atoms necessary for completing a 5- or 6-membered, nitrogen-containing heterocyclic ring selected from the group consisting of (a) a thiazole nucleus including benzothiazole, naphthothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole, (b) a selenazole nucleus, including benzoselenazole, 5-chlorobenzoselenazole, 5-methoxybenzoselenazole, 5-methylbenzoselenazole, 5-hydroxybenzoselenazole, naphtho[2,1-d]selenazole, naphtho[1,2-d]selenazole, (c) an oxazole nucleus, including benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluorobenzowazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole, 5-ethoxybenzoxazole, naphtho[2,1-d]oxazole, naphtho[1,2-d]oxazole, naphtho[2,3-d]oxazole, (d) a quinoline nucleus, including 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, 8-fluoro-4-quinoline, (e) a 3,3-dialkylindolenine nucleus, including 3,3-dimethylindolenine, 3,3-diethylindolenine, 3,3-dimethyl-5-cyanoindolenine, 3,3-dimethyl-5-methoxyindolenine, 3,3-dimethyl-5-methylindolenine, 3,3-dimethyl-5-chloroindolenine, (f) an imidazole nucleus, including 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-alkyl-6-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chlorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, 1-ethylnaphtho[1,2-d]imidazole, (g) a pyridine nucleus, including pyridine, 5-methyl-2-pyridine, 3-methyl-4-pyridine) and a merocyanine nucleus, X represents an acid anion, including but not limited to a halide ion (e.g., Cl⁻, Br⁻ or I⁻), perchlorate ion, sulfamate, thiocyanate ion, acetate ion, methylsulfate ion, ethylsulfate ion, benzenesulfonate ion, toluenesulfonate ion, and m represents 0, 1, 2 and 3.

8. The emulsion of claim 7 wherein said complexing agent is an amine-type acetic acid compound, ester compounds thereof, or alkali metal salt thereof.

9. The emulsion of claim 7 wherein said amine-type acetic acid compounds are present in a range between 0.4 and 40% by weight of silver in said emulsion and are represented by any of the formulae:

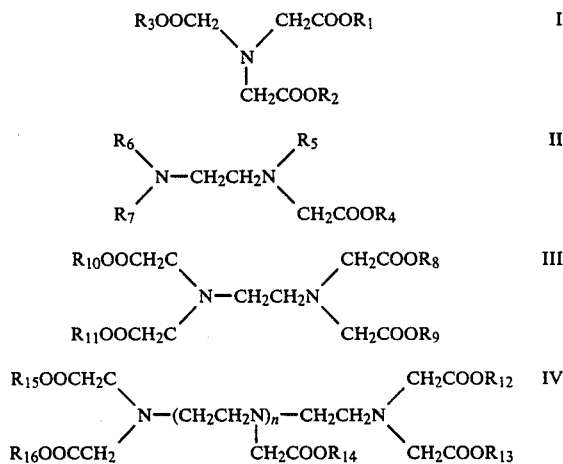

wherein $R_1$ through $R_4$, $R_8$ through $R_{16}$, which can be the same or different, each represents a hydrogen atom, an alkali metal atom, aryl group, or an alkyl group, and $R_5$–$R_7$, which can be the same or different, each represents a hydrogen atom, an alkyl group or an acetic acid group as shown below

wherein $R_1$ is defined above, and n represents an integer of 1 or greater.

10. The emulsion of claim 9 wherein said metal complexing agent was added after spectral sensitization.

11. A photothermographic element comprising a support layer having on at least one surface thereof at least one photothermographic emulsion according to claim 1.

12. A photothermographic element comprising a support layer having on at least one surface thereof at least one photothermographic emulsion according to claim 2.

13. A photothermographic element comprising a support layer having on at least one surface thereof at least one photothermographic emulsion according to claim 3.

14. A photothermographic element comprising a support layer having on at least one surface thereof at least one photothermographic emulsion according to claim 7.

15. A photothermographic element comprising a support layer having on at least one surface thereof at least one photothermographic emulsion according to claim 8.

16. A photothermographic element comprising a support layer having on at least one surface thereof at least one photothermographic emulsion according to claim 9.

17. A photothermographic element comprising a support layer having on at least one surface thereof at least one photothermographic emulsion according to claim 10.

18. The photothermographic emulsion of claim 1 wherein said reducing agent for silver ion comprises a leuco dye reducing agent present in sufficient quantity to generate a visible color image.

19. The photothermographic emulsion of claim 3 wherein said reducing agent for silver ion comprises a leuco dye reducing agent present in sufficient quantity to generate a visible color image.

20. The photothermographic emulsion of claim 7 wherein said reducing agent for silver ion comprises a leuco dye reducing agent present in sufficient quantity to generate a visible color image.

21. The emulsion of claim 1 wherein said silver halide is the reaction product of a halide salt and said silver source material.--

22. The emulsion of claim 2 wherein said silver halide is the reaction product of a halide salt and said silver source material and said metal complexing agent is present as from 0.6 to 35% by weight of total silver in said emulsion.

23. The emulsion of claim 3 wherein said silver halide is the reaction product of a halide salt and said silver source material.--

24. The emulsion of claim 7 wherein said silver halide is the reaction product of a halide salt and said silver source material and said metal complexing agent is present as from 0.6 to 35% by weight of total silver in said emulsion.

25. The emulsion of claim 9 wherein said silver halide is the reaction product of a halide salt and said silver source material.

* * * * *

UNITED STATES PATENT AND TRADEMARK OFFICE
CERTIFICATE OF CORRECTION

PATENT NO. : 4,873,184

DATED : October 10, 1989

INVENTOR(S) : Simpson

It is certified that error appears in the above-identified patent and that said Letters Patent is hereby corrected as shown below:

Column 4, Formula VI, " 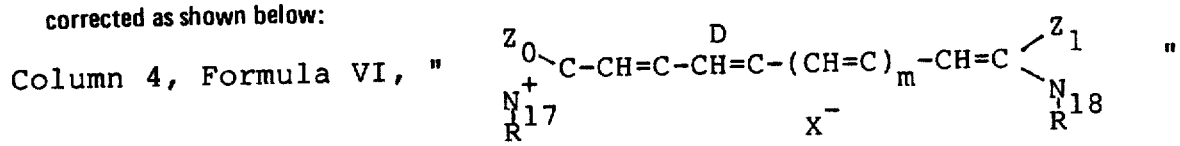 "

should be -- 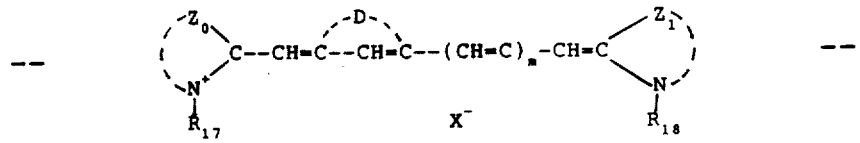 --

Column 4, Formula VII, " 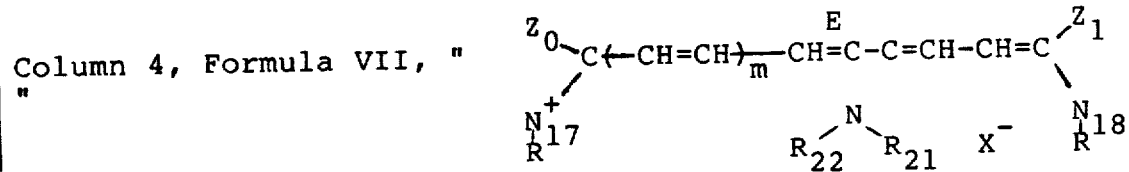 "

should be -- 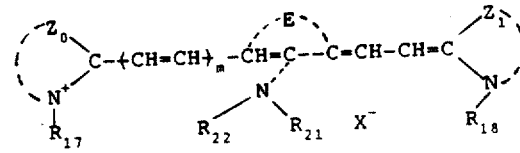 --

UNITED STATES PATENT AND TRADEMARK OFFICE
CERTIFICATE OF CORRECTION

PATENT NO. : 4,873,184

DATED : October 10, 1989

INVENTOR(S) : Simpson

It is certified that error appears in the above-identified patent and that said Letters Patent is hereby corrected as shown below:

Column 4, Formula VIII, " 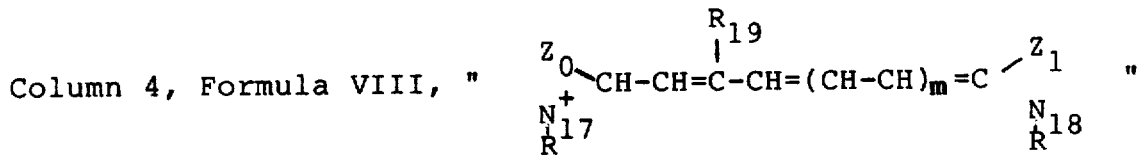 "

should be -- 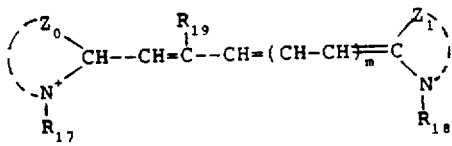 --

Column 9, the last line of the page, insert the following after "are added to the"

--emulsion mixture just prior to coating and after spectral sensitization with the sensitizing dye compounds of formulae VI, VII or VIII. These compounds are usually dissolved in a suitable solvent (for example, methanol, ethanol, water) or a mixture of solvents, and added as a solution to the emulsion. After addition, the mixture is stirred well and then coated onto the photographic substrate.--

Column 12, line 46, "fro" should be --for--.

Column 17, line 34, "10-3" should be --$10^{-3}$--.

Column 18, line 5, "10-3" should be --$10^{-3}$--.

UNITED STATES PATENT AND TRADEMARK OFFICE
CERTIFICATE OF CORRECTION

PATENT NO. : 4,873,184
DATED : October 10, 1989
INVENTOR(S) : Simpson

It is certified that error appears in the above-identified patent and that said Letters Patent is hereby corrected as shown below:

Claim 7, column 19, lines 15-35,

"
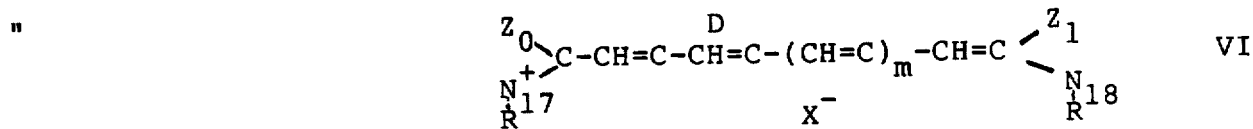 VI

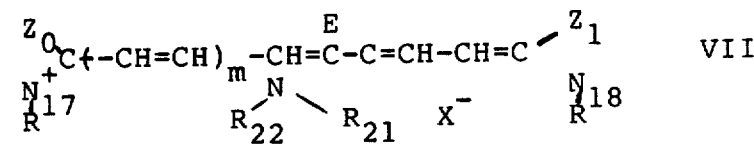 VII

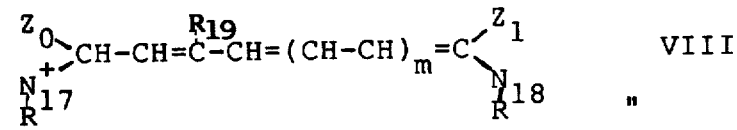 VIII
"

should be --
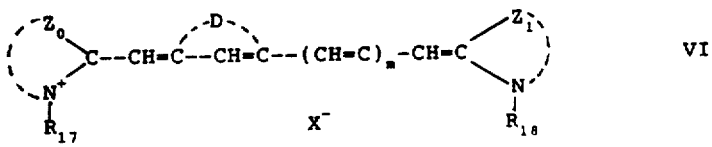 VI

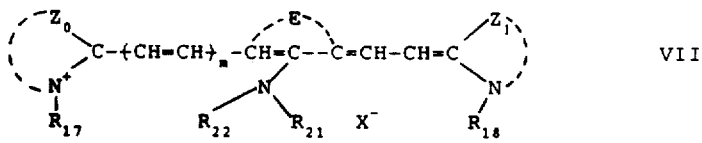 VII

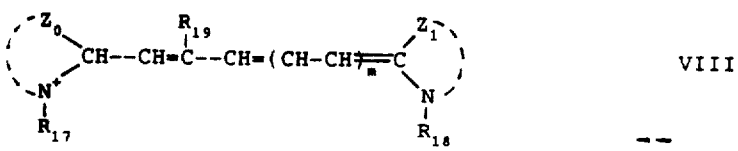 VIII
--

UNITED STATES PATENT AND TRADEMARK OFFICE
CERTIFICATE OF CORRECTION

PATENT NO. : 4,873,184

DATED : October 10, 1989

INVENTOR(S) : Simpson

It is certified that error appears in the above-identified patent and that said Letters Patent is hereby corrected as shown below:

Claim 21, column 22, line 42, delete "--" at end of sentence.

Claim 23, column 22, line 50, delete "--" at end of sentence.

Signed and Sealed this

Third Day of March, 1992

Attest:

HARRY F. MANBECK, JR.

Attesting Officer

Commissioner of Patents and Trademarks